United States Patent
Suto et al.

(10) Patent No.: US 11,946,121 B2
(45) Date of Patent: Apr. 2, 2024

(54) STEEL SHEET FOR BATTERY OUTER TUBE CANS, BATTERY OUTER TUBE CAN AND BATTERY

(71) Applicant: JFE Steel Corporation, Tokyo (JP)

(72) Inventors: Mikito Suto, Tokyo (JP); Yoichiro Yamanaka, Tokyo (JP); Kiyoshi Tachibana, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 687 days.

(21) Appl. No.: 16/633,009

(22) PCT Filed: Jul. 18, 2018

(86) PCT No.: PCT/JP2018/026935
§ 371 (c)(1),
(2) Date: Jan. 22, 2020

(87) PCT Pub. No.: WO2019/021909
PCT Pub. Date: Jan. 31, 2019

(65) Prior Publication Data
US 2020/0227691 A1  Jul. 16, 2020

(30) Foreign Application Priority Data
Jul. 28, 2017  (JP) .................. 2017-146401

(51) Int. Cl.
| | |
|---|---|
| *H01M 50/124* | (2021.01) |
| *C22C 38/00* | (2006.01) |
| *C22C 38/02* | (2006.01) |
| *C22C 38/04* | (2006.01) |
| *C22C 38/08* | (2006.01) |
| *C22C 38/12* | (2006.01) |
| *C22C 38/26* | (2006.01) |
| *H01M 50/119* | (2021.01) |
| *H01M 50/128* | (2021.01) |
| *H01M 50/133* | (2021.01) |

(52) U.S. Cl.
CPC ............ *C22C 38/002* (2013.01); *C22C 38/02* (2013.01); *C22C 38/04* (2013.01); *C22C 38/08* (2013.01); *C22C 38/12* (2013.01); *C22C 38/26* (2013.01); *H01M 50/119* (2021.01); *H01M 50/124* (2021.01); *H01M 50/128* (2021.01); *H01M 50/133* (2021.01)

(58) Field of Classification Search
CPC ....... C22C 38/004; C22C 38/12; C22C 38/26; H01M 50/119; H01M 50/124; H01M 50/128; H01M 50/1243; H01M 50/1245; H01M 50/126
See application file for complete search history.

(56) References Cited

U.S. PATENT DOCUMENTS

| | | | |
|---|---|---|---|
| 5,587,248 A | 12/1996 | Ohmura et al. | |
| 5,679,181 A | 10/1997 | Ohmura et al. | |
| 6,042,952 A * | 3/2000 | Aratani ............... | C21D 8/0226 |
| | | | 148/320 |
| 6,982,011 B1 * | 1/2006 | Pfeifenbring ........... | C25D 5/10 |
| | | | 148/530 |
| 2009/0311595 A1 | 12/2009 | Mori et al. | |
| 2011/0108307 A1 | 5/2011 | Arita et al. | |
| 2012/0009464 A1 | 1/2012 | Nakazawa et al. | |
| 2012/0171518 A1 | 7/2012 | Takematsu et al. | |
| 2013/0089751 A1 | 4/2013 | Hirano et al. | |
| 2013/0130055 A1 | 5/2013 | Miyamoto et al. | |
| 2013/0209867 A1 | 8/2013 | Minagi et al. | |
| 2016/0122891 A1 | 5/2016 | Tani et al. | |
| 2017/0162836 A1 | 6/2017 | Ibaragi et al. | |
| 2018/0187313 A1 | 7/2018 | Shoji et al. | |
| 2018/0366691 A1 | 12/2018 | Sadaki et al. | |

FOREIGN PATENT DOCUMENTS

| | | |
|---|---|---|
| CN | 1059154 C | 12/2000 |
| CN | 101501884 A | 8/2009 |
| CN | 102959136 A | 3/2013 |
| CN | 105283584 A | 1/2016 |
| CN | 109072449 A | 12/2018 |
| EP | 3159418 A1 | 4/2017 |
| JP | 04187741 A | 7/1992 |
| JP | 062104 A | 1/1994 |
| JP | 11185716 A | 7/1999 |
| JP | 2007335205 A | 12/2007 |
| JP | 2009263727 A * | 11/2009 |

(Continued)

OTHER PUBLICATIONS

English Translation of WO2017221763A1, obtained form EPO espacenet on Feb. 26, 2022 (Year: 2022).*
English language translation of JP2009263727 obtained form EPO (eSpacenet) Dec. 9, 2022 (8 pages) (Year: 2022).*
Korean Office Action for Korean Application No. 10-2020-7002376, dated May 9, 2021, with Concise Statement of Relevance of Office Action, 9 pages.
Chinese Office Action with Search Report for Chinese Application No. 201880049187.0, dated May 20, 2021, 6 pages.
International Search Report and Written Opinion for International Application No. PCT/JP2018/026935, dated Sep. 11, 2018, 7 pages.

*Primary Examiner* — Adam Krupicka
(74) *Attorney, Agent, or Firm* — Buchanan Ingersoll & Rooney PC

(57) ABSTRACT

Provided are a steel sheet for battery outer tube cans, which is used for an aftergilding method and is suppressed in the occurrence of scratches, and which enables the achievement of a battery outer tube can that has excellent corrosion resistance and buckling resistance; and a battery outer tube can and a battery, each of which uses this steel sheet for battery outer tube cans. This steel sheet for battery outer tube cans has an Fe—Ni diffusion layer on both surface layers of a steel sheet; the Nb content in the steel sheet is from 0.010% by mass to 0.050% by mass (inclusive); and the adhesion amount of the Fe—Ni diffusion layer per one surface of the steel sheet is from 50 mg/m² to 500 mg/m² (inclusive) in terms of Ni.

7 Claims, No Drawings

(56) References Cited

FOREIGN PATENT DOCUMENTS

| | | |
|---|---|---|
| JP | 2009263727 A | 11/2009 |
| JP | 2010257927 A | 11/2010 |
| JP | 2012062509 A | 3/2012 |
| JP | 4995140 B2 | 8/2012 |
| JP | 2017122281 A | 7/2017 |
| KR | 20110031990 A | 3/2011 |
| KR | 1020120130076 A | 11/2012 |
| KR | 1020170046588 A | 5/2017 |
| WO | 2010143374 A1 | 12/2010 |
| WO | 2016013572 A1 | 1/2016 |
| WO | 2017038786 A1 | 3/2017 |
| WO | 2017094919 A1 | 6/2017 |
| WO | 2017221763 A1 | 12/2017 |

* cited by examiner

STEEL SHEET FOR BATTERY OUTER TUBE CANS, BATTERY OUTER TUBE CAN AND BATTERY

CROSS REFERENCE TO RELATED APPLICATIONS

This is the U.S. National Phase application Of PCT/JP2018/026935, filed Jul. 18, 2018, which claims priority to Japanese Patent Application No. 2017-146401, filed Jul. 28, 2017, the disclosures of these applications being incorporated herein by reference in their entireties for all purposes.

FIELD OF THE INVENTION

The present invention relates to a steel sheet for a battery outer tube can, a battery outer tube can and a battery.

BACKGROUND OF THE INVENTION

As a battery, for instance, a primary battery such as an alkaline manganese battery; a secondary battery such as a lithium ion battery mounted on a notebook computer, a hybrid vehicle or the like are known.

From the viewpoint of corrosion resistance, Ni plating is applied to form a Ni layer on the surface of a steel sheet constituting an outer tube can used for these batteries (battery outer tube can).

There are two methods for manufacturing a battery outer tube can which are different in process of applying Ni plating. One is a pre-plating method in which a steel sheet applied with Ni plating is press-formed into a battery outer tube can and is not followed by plating. The other is a post-plating method in which, using a technique such as barrel plating, Ni plating is applied on the surface of a battery outer tube can that has been press-formed.

As a steel sheet for a battery outer tube can used in the post-plating method, for instance, Patent Literature 1 discloses "a Ni-plated steel sheet for a container, the steel sheet comprising, on a surface that becomes an inner surface of the container through press forming, an Fe—Ni diffusion layer having a thickness of not less than 0.5 µm and not more than 4 µm; and further a Ni layer having a thickness of not less than 0.25 µm and not more than 4 µm thereon; and, on a surface that becomes an outer surface of the container, Ni of a deposition amount of not less than 0.05 g/m² and less than 1.5 g/m², wherein the Ni is diffused inside thereof, and a Ni/(Fe+Ni) mass ratio of a surface layer is not less than 0.1 and not more than 0.9" (claim 1).

In Patent Literature 1, such a steel sheet for a battery outer tube can (Ni-plated steel sheet for a container) is press-formed to be a battery outer tube can, and then Ni plating is applied to the outer surface thereof using a technique such as barrel plating.

Patent Literature

Patent Literature 1: JP 4995140 B

SUMMARY OF THE INVENTION

While a cemented carbide is often used as a material of a forming die (stamping tool) used for press forming in the post-plating method, relatively brittle quenched steel may also be used.

When press forming of the steel sheet for a battery outer tube can (Ni-plated steel sheet for a container) of Patent Literature 1 is repeated using the forming die made of a quenched steel, the forming die may be scratched over time, thereby giving scratches to the formed steel sheet for a battery outer tube can. In this case, since the battery outer tube can thus obtained has scratches, the corrosion resistance thereof may be poor.

Meanwhile, with the increasing demand for a high-performance battery in recent years, an attempt has been made to thin a side wall part of a battery outer tube can (for instance, a cylindrical battery outer tube can) to thereby increase an amount of contents to be filled and enhance performance of a battery. When the battery outer tube can is filled with the contents and a bottom part of the can is seamed, a load is applied to the battery outer tube can in its height direction. At this time, when the side wall part of the battery outer tube can is thinned, buckling may occur in this side wall part. Such buckling may be avoided by using a hard steel sheet. In that case, however, the above-described scratches at the time of forming tend to occur.

Therefore, an object according to aspects of the present invention is to provide a steel sheet for a battery outer tube can used in the post-plating method, with use of which occurrence of scratches is suppressed even when press forming is repeated using a forming die made of quenched steel, and a resulting battery outer tube can is excellent in corrosion resistance and buckling resistance, and to provide a battery outer tube can and a battery using the same.

The present inventors found, through an earnest study, that by using a steel sheet having a particular composition and using a steel sheet for a battery outer tube can having a particular Fe—Ni diffusion layer on each of both surfaces of this steel sheet, the foregoing object can be achieved. Aspects of the invention have been thus completed.

Specifically, aspects of the present invention provide the following [1] to [10].

[1] A steel sheet for a battery outer tube can, the steel sheet comprising an Fe—Ni diffusion layer on each of both surfaces of the steel sheet, wherein a Nb content of the steel sheet is not less than 0.010 mass % and not more than 0.050 mass %, and the Fe—Ni diffusion layer has a deposition amount of not less than 50 mg/m2 and not more than 500 mg/m2 in terms of an amount of Ni per one surface of the steel sheet.

[2] The steel sheet for a battery outer tube can according to [1], wherein a proportion of Ni at an outermost surface of the Fe—Ni diffusion layer is not less than 1.0% and less than 20.0%, where the proportion of Ni is a proportion of the amount of Ni in a total amount of Fe and Ni at the outermost surface of the Fe—Ni diffusion layer, and a unit of the amount of Fe and the amount of Ni is at %.

[3] The steel sheet for a battery outer tube can according to [1] or [2], wherein the Fe—Ni diffusion layer has a thickness of not less than 0.010 µm and less than 0.500 µm.

[4] The steel sheet for a battery outer tube can according to any one of [1] to [3], wherein the steel sheet has a composition including, by mass/C in an amount of not more than 0.010%, Si in amount of not more than 0.02%, Mn in an amount of not more than 0.60%, P in an amount of not more than 0.020%, S in an amount of not more than 0.020%, Ni in an amount of not more than 0.05%, N in an amount of not more than 0.0050%, Nb in an amount of not less than 0.010% and not more than 0.050%, and Cr in an amount of not more than 1.0%, with the balance being Fe and inevitable impurities.

[5] A battery outer tube can comprising: an Fe—Ni diffusion layer on each of an inner surface and an outer surface of the steel sheet formed in a shape of the battery outer tube can; and further a Ni layer on the Fe—Ni diffusion layer on the outer surface of the steel sheet, wherein a Nb content of the steel sheet is not less than 0.010 mass % and not more than 0.050 mass %, and part of the Fe—Ni diffusion layer on the outer surface of the steel sheet constitutes an Fe—Ni diffusion layer A having a deposition amount of not less than 50 mg/m$^2$ and not more than 500 mg/m$^2$ in terms of an amount of Ni per one surface of the steel sheet.

[6] The a battery outer tube can according to [5], wherein a proportion of Ni at an outermost surface of the Fe—Ni diffusion layer is not less than 1.0% and less than 20.0%, where the proportion of Ni is a proportion of the amount of Ni in a total amount of Fe and Ni at the outermost surface of the Fe—Ni diffusion layer, and a unit of the amount of Fe and the amount of Ni is at %.

[7] The battery outer tube can according to [5] or [6], wherein the Fe—Ni diffusion layer has a thickness of not less than 0.010 μm and less than 0.500 μm.

[8] The battery outer tube can according to any one of [5] to [7], wherein the Ni layer has a thickness of not less than 1 μm.

[9] The battery outer tube can according to any one of [5] to [8], wherein the steel sheet has a composition including, by mass, C in an amount of not more than 0.010%, Si in amount of not more than 0.02%, Mn in an amount of not more than 0.60%, P in an amount of not more than 0.020%, S in an amount of not more than 0.020%, Ni in an amount of not more than 0.05%, N in an amount of not more than 0.0050%, Nb in an amount of not less than 0.010% and not more than 0.050%, and Cr in, an amount of not more than 1.0%, with the balance being Fe and inevitable impurities.

[10] A battery, comprising the battery outer tube can according to any one of [5] to [9], and further comprising an electrolyte solution, an electrode, and a separator which are disposed in the battery outer tube can.

According to aspects of the present invention, it is possible to provide a steel sheet for a battery outer tube can used in a post-plating method, with use of which occurrence of scratches is suppressed even when press forming is repeated using a forming die made of quenched steel, and a resulting battery outer tube can is excellent in corrosion resistance and buckling resistance, and to provide a battery outer tube can and a battery using the same.

DETAILED DESCRIPTION OF EMBODIMENTS OF THE INVENTION

[Steel Sheet for Battery Outer Tube Can]

A steel sheet for a battery outer tube can according to aspects of the present invention (hereinafter also simply referred to as a "steel sheet for a can according to aspects of the invention") is a steel sheet for a battery outer can, comprising a Fe—Ni diffusion layer on each of both surfaces of the steel sheet, wherein a Nb content of the steel sheet is not less than 0.010 mass % and not more than 0.050 mass %, and the Fe—Ni diffusion layer has a deposition amount of not less than 50 mg/m$^2$ and not more than 500 mg/m$^2$ in terms of an amount of Ni per one surface of the steel sheet (hereinafter also referred to as "Ni deposition amount").

The steel sheet for a can according to aspects of the invention is a steel sheet for a battery outer tube can used in a post-plating method, with use of which occurrence of scratches is suppressed even when press forming is repeated using a forming die made of quenched steel, and a resulting battery outer tube can is excellent in corrosion resistance and buckling resistance.

The presumable reason therefor is described below.

First, the steel sheet for a battery outer tube can used in a post-plating method as described in Patent Literature 1 has "a Fe—Ni diffusion layer having a thickness of not less than 0.5 μm . . . on a surface that becomes an inner surface of the container through press forming." The Ni deposition amount of this Fe—Ni diffusion layer can be calculated to be not less than 4500 mg/m$^2$.

The steel sheet for a battery outer tube can of Patent Literature 1 becomes hard because the Ni deposition amount of the Fe—Ni diffusion layer is too large, and a forming die made of relatively brittle quenched steel is scratched over time in the repeated press forming. The forming die thus scratched is used, thereby giving scratches to the formed steel sheet for a battery outer tube can.

However, the Fe—Ni diffusion layer of the steel sheet for a can according to aspects of the invention has a Ni deposition amount of not more than 500 mg/m$^2$ that is moderately small, and is soft enough not to scratch a forming die made of quenched steel. For this reason, occurrence of scratches on the formed steel sheet for a battery outer tube can is suppressed (hereinafter also referred to as "excellent in scratch resistance"). Since the steel sheet for a can according to aspects of the invention is excellent in scratch resistance in this way, the corrosion resistance of the resulting battery outer tube can is also excellent.

If the Ni deposition amount of the Fe—Ni diffusion layer of the steel sheet for a can according to aspects of the present invention is too small, there is a concern that the corrosion resistance of the battery outer tube can obtained is poor. However, since the steel sheet for a can according to aspects of the invention has a Ni deposition amount of the Fe—Ni diffusion layer of not less than 50 mg/m$^2$ that is moderately large, the corrosion resistance of the steel sheet formed into a battery outer tube can (hereinafter simply referred to as "corrosion resistance") is excellent.

More specifically, since the Fe—Ni diffusion layer is electrochemically stable at the inner surface of the steel sheet formed into a battery outer tube can, the corrosion resistance to the contents is improved as compared with the case where the Fe—Ni diffusion layer is absent or too small.

On the other hand, Ni plating is applied to form a Ni layer on the outer surface by barrel plating or the like after forming, and some pinholes are present in this Ni layer, so that corrosion progresses from the pinholes. However, since the Fe—Ni diffusion layer of a moderate amount is provided as a base layer of the Ni layer, the potential difference between the Ni layer and the base layer can be reduced and thus the corrosion resistance is improved as compared with the case where the Fe—Ni diffusion layer is absent or too small.

Meanwhile, as described above, when the battery outer tube can is filled with the contents and the bottom part of the can is seamed, a load is applied to the battery outer tube can in its height direction. At this time, when the side wall part of the battery outer tube can is thinned, buckling may occur in this side wall part. Although such buckling may be avoided by using a hard steel sheet, the scratch resistance described above may be insufficient.

Therefore, a steel sheet having a specific composition is used in accordance with aspects of the present invention. More specifically, the Nb content of the steel sheet is set to not less than 0.010 mass % and not more than 0.050 mass %. Consequently, the steel sheet for a can according to aspects of the invention is hardened to the lower limit at which no buckling occurs, and the buckling resistance of the steel sheet formed into a battery outer tube can (hereinafter also simply referred to as "buckling resistance") is excellent, while excellent scratch resistance is also obtained.

The constituent elements of the steel sheet for a can according to aspects of the invention are described in detail below.

<Steel Sheet>

As the steel sheet for a can according to aspects of the invention, a steel sheet having a Nb content of not less than 0.010 mass % and not more than 0.050 mass % is used. When the Nb content of the steel sheet falls within the above-described range, both scratch resistance and buckling resistance are excellent as described above.

Since the buckling resistance becomes more excellent, the Nb content of the steel sheet is preferably not less than 0.020 mass % and less than 0.040 mass %.

Examples of the steel sheet include a steel sheet obtained by adding Nb in an amount of not less than 0.010 mass % and not more than 0.050 mass % to an extremely low carbon steel (C: not more than 0.010 mass %), and a specific example thereof is preferably a steel sheet having a composition including, by mass, C in an amount of not more than 0.010%, Si in amount of not more than 0.02%, Mn in an amount of not more than 0.60%, P in an amount of not more than 0.020%, S in an amount of not more than 0.020%, Ni in an amount of not more than 0.05%, N in an amount of not more than 0.0050%, Nb in an amount of not less than 0.010% and not more than 0.050%, and Cr in an amount of not more than 1.0%, with the balance being Fe and inevitable impurities.

Generally, when the amount of C present in the state of solid solution in the steel is larger, the yield elongation becomes larger, tending to cause age hardening, stretcher strain during processing, and the like. Therefore, the C content of the steel sheet is preferably not more than 0.010 mass %.

Since when a large amount of Si is added, the surface treatability and the corrosion resistance of the steel sheet may become insufficient, the Si content of the steel sheet is preferably not more than 0.02 mass %.

Since Mn may excessively harden the steel sheet, the Mn content of the steel sheet is preferably not more than 0.60 mass %.

Since when a large amount of P is added, hardening of the steel, deterioration of corrosion resistance, and the like may occur, the P content of the steel sheet is preferably not more than 0.020 mass %.

The hot ductility of the steel may be lowered when S is combined with Mn in the steel to form MnS and a large amount of MnS is precipitated. Therefore, the S content of the steel sheet is preferably not more than 0.020 mass %.

Since Ni is an element that improves corrosion resistance of steel but is a rare element, containing Ni in the entire steel leads to an increase in an alloy cost. Therefore, the Ni content of the steel sheet is preferably not more than 0.05 mass %.

The steel is hardened as the amount of N increases. However, due to inevitable inclusion of N, variation in hardness of the steel sheet becomes large. For this reason, N is not suitable for the hardness control desired in accordance with aspects of the present invention. Therefore, the N content of the steel sheet is preferably not more than 0.0050 mass %, which hardly affects the hardening.

The Nb content is as described above.

Cr is an element that improves corrosion resistance of steel but hardens the steel so as to lower the formability or form a Cr oxide on the surface of the steel sheet at the time of annealing, so that a desired surface state may not be obtained. Therefore, the Cr content of the steel sheet is preferably not more than 1.0 mass %.

The manufacturing method of the steel sheet is not particularly limited. For instance, the steel sheet is manufactured through a process starting with a typical billet manufacturing process, followed by such processes as hot rolling, pickling, cold rolling, annealing and temper rolling.

Since the formation of the Fe—Ni diffusion layer is essential in accordance with aspects of the present invention, it is most efficient in production to apply Ni plating to an unannealed steel sheet after cold rolling, and diffuse the Ni plate inside the steel sheet with annealing treatment of the steel sheet. For this reason, the unannealed steel sheet after cold rolling is preferable as a steel sheet used for the formation of the Fe—Ni diffusion layer.

<Fe—Ni Diffusion Layer>

The steel sheet for a can according to aspects of the invention has an Fe—Ni diffusion layer on each of both surfaces of the steel sheet.

<Ni Deposition Amount>

The Fe—Ni diffusion layer has a deposition amount of not less than 50 mg/m$^2$ and not more than 500 mg/m$^2$ per one surface of the steel sheet in term of an amount of Ni (Ni deposition amount). Therefore, the steel sheet for a can according to aspects of the invention is excellent in both scratch resistance and corrosion resistance as described above. The Ni deposition amount of the Fe—Ni diffusion layer is preferably not more than 350 mg/m$^2$, and more preferably not more than 300 mg/m$^2$ because the scratch resistance can be more excellent.

The Ni deposition amount of the Fe—Ni diffusion layer can be measured by surface analysis using X-ray fluorescence spectrometry. In this case, a Ni deposition sample with a known Ni amount is used to specify a calibration curve for the Ni deposition amount in advance, and the calibration curve is used to quantify the Ni deposition amount. The X-ray fluorescence spectrometry is performed under, for instance, the following conditions:

Apparatus: System 3270 X-ray fluorescence spectrometer, manufactured by Rigaku Corporation
Measurement diameter: 30 mm
Measurement atmosphere: Vacuum
Spectrum: Ni-Kα
Slit: COARSE
Dispersive crystal: TAP Use is made of the count number of peaks of Ni-Kα in the X-ray fluorescence spectrometry of the Fe—Ni diffusion layer as measured under the foregoing conditions. Reference samples with known deposition amounts measured by the weight-based method are used to specify a calibration curve for the Ni deposition amount in advance, and the calibration curve is used to determine the Ni deposition amount.

<<Thickness>>

In the steel sheet for a can according to aspects of the invention, the thickness of the Fe—Ni diffusion layer is preferably not less than 0.010 μm and less than 0.500 μm because it is easy to maintain the Fe—Ni diffusion layer even after the forming process and both scratch resistance and corrosion resistance are more excellent. In addition, the thickness of the Fe—Ni diffusion layer is more preferably not more than 0.400 μm, and even more preferably not more than 0.380 μm because the scratch resistance is further excellent.

The thickness of the Fe—Ni diffusion layer can be measured by the glow discharge emission analysis (GDS). Specifically, first, sputtering is performed from the surface of the Fe—Ni diffusion layer toward the inside of the steel sheet, and analysis in the depth direction is performed to determine the sputtering time at which the strength of Ni becomes 1/10 of the maximum value. Subsequently, the relationship between the sputtering depth and the sputtering time in the GDS is obtained using pure iron. By using this relationship, the sputtering depth is calculated in terms of pure iron from the determined sputtering time at which the strength of Ni is 1/10 of the maximum value, and the calculated value is taken as the thickness of the Fe—Ni diffusion layer. The GDS was performed under the following conditions:

Apparatus: GDA750 manufactured by Rigaku Corporation
    Anode inner diameter: 4 mm
    Analysis mode: High-frequency low-voltage mode
    Discharged power: 40 W
    Control pressure: 2.9 hPa
    Detector: Photomultiplier
    Detected wavelength: Ni=341.4 nm <<Ni Proportion>>

In the steel sheet for a can according to aspects of the invention, a proportion of Ni at the outermost surface of the Fe—Ni diffusion layer (hereinafter also simply referred to as "Ni proportion") is preferably not less than 1.0% and less than 20.0% because the scratch resistance and the corrosion resistance can be excellent.

The Ni proportion at the outermost surface of the Fe—Ni diffusion layer is important because Ni at the outermost surface of the Fe—Ni diffusion layer has a direct effect on the corrosion resistance, while Ni diffused in the steel has a small effect on improvement in corrosion resistance. On the other hand, when the Ni proportion is too high, the outermost surface may become hard and the scratch resistance may become insufficient. Therefore, the preferable range of the Ni proportion is not less than 1.0% and less than 20.0% as described above.

Since the scratch resistance is further excellent, the Ni proportion is preferably not less than 3.0%. For the same reason, the Ni proportion is more preferably not less than 15.0% and even more preferably not less than 13.0%.

The Ni proportion (unit: %) at the outermost surface of the Fe—Ni diffusion layer is the proportion of the amount of Ni in the total amount of Fe and Ni at the outermost surface of the Fe—Ni diffusion layer, that is, the Ni proportion is calculated by an expression "amount of Ni/(amount of Fe+Ni)×100." The unit of the amount of Fe and the amount of Ni is at %.

The amount of Fe (unit: at %) and the amount of Ni (unit: at %) at the outermost surface of the Fe—Ni diffusion layer can be measured by performing Auger electron spectroscopy measurement on the steel sheet on which the Fe—Ni diffusion layer was formed and which has undergone ultrasonic cleaning in acetone for 10 minutes and no sputtering. In the Auger electron spectroscopy measurement, measurement is performed at 10 locations in different fields of view in a single sample, and the amount of Fe and the amount of Ni are each set to be the average value of the measurement results of the 10 locations. The Auger electron spectroscopy measurement was performed under the following conditions:

Apparatus: PHI660 manufactured by ULVAC-PHI Inc.
    Observation and analysis conditions: acceleration voltage 10.0 kV, current value 0.5 µA
    Observation magnification 1,000 times, measurement range 540 to 900 eV <<Formation Method of Fe—Ni Diffusion Layer>>

The method of forming the Fe—Ni diffusion layer on each of both surfaces of the steel sheet is not particularly limited, and one example thereof is as follows.

First, pre-treatment (degreasing, pickling, etc.) is performed, as necessary, on an unannealed steel sheet after cold rolling, and then Ni plating is applied to the steel sheet using a Ni plating bath under appropriately adjusted conditions such as current density. Examples of the Ni plating bath include a watt bath, a sulfamic acid bath, a borofluoride bath and a chloride bath.

In this process, the deposition amount of Ni plating is not less than 50 mg/m$^2$ and not more than 500 mg/m$^2$ per one surface of the steel sheet. As a result, the Ni deposition amount of the Fe—Ni diffusion layer to be formed can be not less than 50 mg/m$^2$ and not more than 500 mg/m$^2$.

Next, annealing (preferably continuous annealing) for the purpose of recrystallization treatment of the steel sheet is performed on the Ni-plated steel sheet. While the steel sheet is annealed, Ni plating is diffused into the steel sheet to form a Fe—Ni diffusion layer.

As the annealing condition, the soaking temperature is preferably 600° C. to 800° C., and the retaining time at the soaking temperature is preferably 10 seconds to 60 seconds. With the shorter retaining time at the soaking temperature, Ni is less likely to diffuse in the steel and the Ni proportion at the outermost surface becomes larger. Therefore, from the viewpoint of corrosion resistance, the retaining time at the soaking temperature is more preferably less than 30 seconds.

This annealing condition is preferable because the thickness of the Fe—Ni diffusion layer to be formed can be not less than 0.010 µm and less than 0.500 µm, and the Ni proportion at the outermost surface can be not less than 1.0% and less than 20.0%.

After formation of the Fe—Ni diffusion layer, shape correction, surface roughness adjustment and the like may be performed by temper rolling as necessary.

[Manufacturing Method of Battery Outer Tube Can]

Next, a manufacturing method of a battery outer tube can using the steel sheet for a can according to aspects of the invention (hereinafter also referred to as "manufacturing method according to aspects of the invention" for convenience) is described below.

One example of the manufacturing method according to aspects of the invention is a method comprising: a step of forming the steel sheet for a can according to aspects of the invention into a shape of the battery outer tube can (for instance, a cylindrical shape) through press forming using a forming die; and a step of applying Ni plating to form a Ni layer on the outer surface of the steel sheet for a can according to aspects of the invention formed into the shape of the battery outer tube can.

<Forming (Press Forming)>

The method of forming (press forming) is not particularly limited, and examples thereof include general methods used for forming a battery outer tube can. For instance, the steel sheet for a can according to aspects of the invention is punched into a circular shape, drawn into a cup shape, and formed into a cylindrical shape or the like by re-drawing and a DI (Drawing and Ironing) process.

At this time, while a cemented carbide is often used as the material of the forming die, relatively brittle hardened steel may also be used. Since the Fe—Ni diffusion layer of the steel sheet for a can according to aspects of the invention does not apparently give scratches to the forming die made of quenched steel as described above, occurrence of scratches on the steel sheet for a resulting battery outer tube can is suppressed.

The Ni deposition amount, the thickness and the Ni proportion of the press-formed Fe—Ni diffusion layer before press forming may not be maintained but may be changed through the press forming.

However, in the steel sheet for a can according to aspects of the invention, at least part of the portion to be the outer surface of the battery outer tube can (for instance, the portion to be the end face of the protrusion on the positive terminal of the battery outer tube can) is not press-formed, and unprocessed.

Therefore, in at least part of the outer surface of the battery outer tube can obtained by using the steel sheet for can according to aspects of the invention (the battery outer tube can according to aspects of the present invention), the Ni deposition amount, the thickness and the Ni proportion of the Fe—Ni diffusion layer in the steel sheet for a can according to aspects of the invention before press forming are maintained as they are.

<Ni Plating after Steel Sheet is Formed into Shape of Battery Outer Tube Can>

The method of applying Ni plating is not particularly limited, and a conventionally known method may be used. For instance, Ni plating is applied to the steel sheet for a can according to aspects of the invention, which has been formed into a shape of the battery outer tube can, by barrel plating using a Ni plating bath under appropriately adjusted conditions such as current density. Examples of the Ni plating bath include a watt bath, a sulfamic acid bath, a borofluoride bath and a chloride bath.

Consequently, Ni plating is applied to form a Ni layer on the Fe—Ni diffusion layer on at least the outer surface of the steel sheet for a can according to aspects of the invention, which has been formed into a shape of the battery outer tube can.

At this time, since the steel sheet for a can according to aspects of the present invention has been formed into a shape of the battery outer tube can, Ni plating solution hardly enters the inside thereof, and it is difficult to apply Ni plating to the inner surface of the steel sheet for a can according to aspects of the present invention in the shape of the battery outer tube can. Of course, Ni plating may be applied to form a Ni layer also on the inner surface as with the outer surface of the steel sheet for a can according to aspects of the invention in the shape of the battery outer tube can.

The thickness of the Ni plating (Ni layer) formed on the Fe—Ni diffusion layer is preferably not less than 1 μm, and more preferably not less than 2 μm from the viewpoint of corrosion resistance. The upper limit of the thickness of the Ni layer is not particularly limited, and the thickness of the Ni layer is, for instance, preferably not more than 7 μm from the viewpoint of economic efficiency.

[Battery Outer Tube Can]

The battery outer tube can according to aspects of the present invention is a battery outer tube can obtained using the steel sheet for a can according to aspects of the invention.

More specifically, the battery outer tube can according to aspects of the present invention is a battery outer tube can having a Ni layer formed on the outer surface of the steel sheet for a can according to aspects of the invention, which has been press-formed into a shape of the battery outer tube can.

That is, the battery outer tube can according to aspects of the present invention is a battery outer tube can comprising: an Fe—Ni diffusion layer on each of an inner surface and an outer surface of a steel sheet formed in a shape of the battery outer tube can; and further a Ni layer on the Fe—Ni diffusion layer on the outer surface of the steel sheet, wherein a Nb content of the steel sheet is not less than 0.010 mass % and not more than 0.050 mass %, and part of the Fe—Ni diffusion layer on the outer surface of the steel sheet constitutes an Fe—Ni diffusion layer A having a deposition amount of not less than 50 mg/m$^2$ and not more than 500 mg/m$^2$ in terms of an amount of Ni per one surface of the steel sheet.

In the battery outer tube can according to aspects of the present invention, first, a steel sheet is formed into a shape of the battery outer tube can by press forming, and an Fe—Ni diffusion layer is formed on each of both surfaces (inner and outer surfaces) of this steel sheet as with the steel sheet for a can according to aspects of the invention. Then, Ni plating is applied to the Fe—Ni diffusion layer on at least the outer surface of the steel sheet to form a Ni layer thereon.

Here, as described above, in at least part of the Fe—Ni diffusion layer on the outer surface of the battery outer tube can according to aspects of the present invention, the Fe—Ni diffusion layer in the steel sheet for a can according to aspects of the invention before press forming (Ni deposition amount of not less than 50 mg/m$^2$ and not more than 500 mg/m$^2$) is maintained as it was.

That is, in the battery outer tube can according to aspects of the present invention, at least part of the Fe—Ni diffusion layer on the outer surface of the steel sheet in the shape of the battery outer tube can (the part in which the Fe—Ni diffusion layer in the steel sheet for a can according to aspects of the invention before press forming is maintained as it was) constitutes the Fe—Ni diffusion layer A having a Ni deposition amount of not less than 50 mg/m$^2$ and not more than 500 mg/m$^2$.

The preferable ranges of the Ni deposition amount, the thickness and the Ni proportion of the Fe—Ni diffusion layer A in the battery outer tube can according to aspects of the present invention are the same as those of the Ni deposition amount, the thickness and the Ni proportion of the Fe—Ni diffusion layer in the steel sheet for a can according to aspects of the invention.

In the battery outer tube can according to aspects of the present invention, the thickness of the Ni layer on the Fe—Ni diffusion layer is preferably not less than 1 μm, and more preferably not less than 2 μm as described above. The upper limit thereof is not particularly limited and is preferably not more than 7 μm.

[Battery]

The battery according to aspects of the present invention is a battery comprising the battery outer tube can according to aspects of the present invention, and further comprising an electrolyte solution, an electrode and a separator which are disposed in the battery outer tube can according to aspects of the present invention.

That is, the battery according to aspects of the present invention has at least an electrolyte solution, an electrode, and a separator, which are essential components of a battery, filling the battery outer tube can according to aspects of the present invention, and may further have other constituents inside thereof as necessary.

The battery according to aspects of the present invention is excellent in corrosion resistance because the battery outer tube can according to aspects of the present invention is used.

EXAMPLES

Aspects of the present invention are specifically described below with reference to examples. However, the present invention should not be construed as being limited to the following examples.

<Manufacture of Steel Sheet for Battery Outer Tube Can>

As a steel sheet, Nb-added extremely low carbon steel that has not undergone annealing but cold rolling and has a thickness of 0.25 mm (steel composition includes, by mass, C in an amount of 0.002%, Si in an amount of 0.02%, Mn in an amount of 0.15%, P in an amount of 0.010%, S in an amount of 0.008%, Ni in an amount of 0.03%, N in an amount of 0.0030%, Nb in each amount shown in Table 1 below, Cr in an amount of 0.5%) was used. The steel sheet was subjected to pretreatment including degreasing and pickling.

Ni plating was applied to the steel sheet using a watt bath after the pretreatment. At this time, current density and other conditions were appropriately adjusted so as to obtain each of the Ni deposition amounts (unit: $mg/m^2$) described in Table 1 below.

Next, a Ni-plated steel sheet was introduced into a continuous annealing line and annealed to diffuse Ni into the steel sheet to thereby form a Fe—Ni diffusion layer on each of both surfaces of the steel sheet. At this time, by setting the annealing condition (soaking temperature and retaining time) as shown in Table 1 below, the thickness (unit: μm) and the Ni proportion (unit: %) of the Fe—Ni diffusion layer were set to have the values shown in Table 1 below.

After formation of the Fe—Ni diffusion layer, temper rolling was performed to obtain Test Materials Nos. 1 to 30 of the steel sheets for a battery outer tube can.

<Manufacture of Battery Outer Can>

<<Forming>>

The obtained steel sheet for a battery outer tube can was punched into a circular shape, drawn into a cup shape, and subjected to re-drawing and a DI process to be thereby formed into a cylindrical 18650-type battery outer tube can. The thickness of the side wall portion was thinned by the DI process to 0.15 mm.

<<Ni Plating>>

Thereafter, Ni plating was applied to at least the outer surface of the steel sheet which was formed into the shape of the battery outer tube can, by barrel plating to form a Ni layer having a thickness of 4 μm. Thus, a battery outer tube can was obtained.

<Evaluation>

<<Corrosion Resistance>>

An aqueous solution in which 5 g of sodium chloride and 1.5 cc of a 30% hydrogen peroxide solution were mixed into 100 g of pure water was prepared. The obtained battery outer tube can was immersed in this aqueous solution for 16 hours at room temperature. After immersion, the battery outer tube can was taken out and was visually checked for presence of perforations. When any perforation was observed, "B" was described in Table 1 below, and when no perforation was observed, "A" was described in Table 1 below. When the result is "A," the corrosion resistance is excellent.

<<Scratch Resistance>>

The above-described forming process was repeated using a forming die made of quenched steel, and the number of times of repetitions until scratches were visually observed on the surface of the steel sheet which was formed into the shape of the battery outer tube can (number of manufactured cans) was counted.

When the number of manufactured cans until scratches were observed was not more than 50,000, "D" was described in Table 1 below, when the number was more than 50,000 and not more than 70,000, "C" was described in Table 1 below, when the number was more than 70,000 and not less than 100,000, "B" was described in Table 1 below, and when no scratch was observed even when the number of manufactured cans exceeded 100,000, "A" was described in Table 1 below.

When the result is "A," "B," or "C," the scratch resistance is excellent. Practically, "A" or "B" is preferable, and "A" is more preferable.

<<Buckling Resistance>>

The obtained cylindrical battery outer tube can was filled with the contents, and the bottom part of the can was seamed. At this time, it was confirmed whether or not buckling occurred in the battery outer tube can. The incidence rate (unit: %) of buckled cans (battery outer tube cans with buckling) per 1,000 cans was determined. When the incidence rate of buckled cans was not less than 10%, "D" was described in Table 1 below, when the incidence rate was not less than 3% and less than 10%, "C" was described in Table 1 below, when the incidence rate was not less than 1% and not more than 3%, "B" was described in Table 1 below, and when the incidence rate was less than 1%, "A" was described in Table 1 below.

When the result is "A" or "B," buckling resistance is excellent.

TABLE 1

| Test Material No. | Steel sheet Nb content [mass %] | Anneling condition Soaking temperature [° C.] | Anneling condition Retaining time [sec] | Fe—Ni diffusion layer Ni deposition amount [mg/m²] | Fe—Ni diffusion layer Thickness [μm] | Fe—Ni diffusion layer Ni proportion [%] | Evaluation Corrosion resistance | Evaluation Scratch resistance | Evaluation Buckling resistance | Remarks |
|---|---|---|---|---|---|---|---|---|---|---|
| 1 | 0.020 | 700 | 30 | 50 | 0.071 | 1.1 | A | A | A | Inventive example |
| 2 | 0.020 | 700 | 30 | 100 | 0.131 | 3.5 | A | A | A | Inventive example |
| 3 | 0.020 | 700 | 30 | 200 | 0.250 | 7.1 | A | A | A | Inventive example |
| 4 | 0.020 | 700 | 30 | 300 | 0.360 | 10.5 | A | A | A | Inventive example |
| 5 | 0.020 | 700 | 30 | 400 | 0.450 | 15.2 | A | B | A | Inventive example |
| 6 | 0.020 | 700 | 30 | 500 | 0.499 | 18.1 | A | B | A | Inventive example |
| 7 | 0.020 | 500 | 30 | 200 | 0.105 | 13.2 | A | B | A | Inventive example |
| 8 | 0.020 | 600 | 30 | 200 | 0.121 | 8.5 | A | A | A | Inventive example |
| 9 | 0.020 | 800 | 30 | 200 | 0.161 | 3.0 | A | A | A | Inventive example |
| 10 | 0.020 | 700 | 30 | 600 | 0.600 | 22.4 | A | D | A | Comparative example |
| 11 | 0.020 | 700 | 30 | 1000 | 1.150 | 50.0 | A | D | A | Comparative example |
| 12 | 0.020 | 700 | 30 | 10 | 0.005 | 0.5 | B | A | A | Comparative example |
| 13 | 0.020 | 700 | 20 | 50 | 0.064 | 1.2 | A | A | A | Inventive example |

TABLE 1-continued

| | | Anneling condition | | Fe—Ni diffusion layer | | | Evaluation | | | |
|---|---|---|---|---|---|---|---|---|---|---|
| Test Material No. | Steel sheet Nb content [mass %] | Soaking temperature [° C.] | Retaining time [sec] | Ni deposition amount [mg/m²] | Thickness [μm] | Ni proportion [%] | Corrosion resistance | Scratch resistance | Buckling resistance | Remarks |
| 14 | 0.020 | 700 | 20 | 100 | 0.118 | 3.9 | A | A | A | Inventive example |
| 15 | 0.020 | 700 | 20 | 200 | 0.225 | 7.8 | A | A | A | Inventive example |
| 16 | 0.020 | 700 | 20 | 300 | 0.324 | 11.6 | A | A | A | Inventive example |
| 17 | 0.020 | 700 | 20 | 400 | 0.405 | 16.7 | A | B | A | Inventive example |
| 18 | 0.020 | 700 | 20 | 500 | 0.449 | 19.9 | A | B | A | Inventive example |
| 19 | 0.020 | 500 | 20 | 200 | 0.095 | 14.5 | A | B | A | Inventive example |
| 20 | 0.020 | 600 | 20 | 200 | 0.109 | 9.4 | A | A | A | Inventive example |
| 21 | 0.020 | 800 | 20 | 200 | 0.145 | 3.3 | A | A | A | Inventive example |
| 22 | 0.020 | 700 | 20 | 600 | 0.540 | 25.0 | A | D | A | Comparative example |
| 23 | 0.020 | 700 | 20 | 1000 | 1.000 | 50.0 | A | D | A | Comparative example |
| 24 | 0.020 | 700 | 20 | 10 | 0.005 | 0.5 | B | A | A | Comparative example |
| 25 | 0.020 | 700 | 5 | 200 | 0.053 | 25.0 | A | C | A | Inventive example |
| 26 | 0.020 | 700 | 28 | 200 | 0.245 | 7.3 | A | A | A | Inventive example |
| 27 | 0.020 | 700 | 60 | 200 | 0.300 | 4.5 | A | A | A | Inventive example |
| 28 | 0.040 | 700 | 5 | 200 | 0.053 | 25.0 | A | C | B | Inventive example |
| 29 | 0.005 | 700 | 28 | 200 | 0.245 | 7.3 | A | A | D | Comparative example |
| 30 | 0.060 | 700 | 60 | 200 | 0.300 | 4.5 | A | D | A | Comparative example |

As shown in Table 1 above, Test Materials Nos. 10, 11, 22, and 23 in which the Ni deposition amount of the Fe—Ni diffusion layer exceeded 500 mg/m² were poor in scratch resistance.

Test Material Nos. 12 and 24 in which the Ni deposition amount of the Fe—Ni diffusion layer was less than 50 mg/m² were poor in corrosion resistance.

Test material No. 29 in which the Nb content of the steel sheet was less than 0.010 mass % was poor in buckling resistance. Test material No. 30 in which the Nb content of the steel sheet was more than 0.050 mass % was excellent in buckling resistance but poor in scratch resistance.

On the other hand, Test Material Nos. 1 to 9, 13 to 21 and 25 to 28 in which the Nb content of the steel sheet was not less than 0.010 mass % and not more than 0.050 mass %, and the Ni deposition amount of the Fe—Ni diffusion layer was not less than 50 mg/m² and not more than 500 mg/m² were excellent in all of corrosion resistance, scratch resistance and buckling resistance.

When Test Material Nos. 1 to 9, 13 to 21 and 25 to 28 are compared with each other, Test Material Nos. 1 to 9, 13 to 21 and 26 to 27 in which the Ni proportion at the outermost surface of the Fe—Ni diffusion layer was not less than 1.0% and less than 20.0% is more excellent in scratch resistance than Test Material Nos. 25 and 28 in which the Ni proportion was not less than 20.0%.

When Test Material Nos. 1 to 9 are compared with each other, Test Material Nos. 1 to 4 and 8 to 9 each having a lower Ni proportion than those of Test Materials Nos. 5 to 7 were more excellent in scratch resistance than Test Material Nos. 5 to 7.

Similarly, when Test Material Nos. 13 to 21 are compared with each other, Test Material Nos. 13 to 16, 20 and 21 each having a lower Ni proportion than those of Test Materials Nos. 17 to 19 were more excellent in scratch resistance than Test Material Nos. 17 to 19.

When Test Material Nos. 25 and 28 are compared with each other, Test material No. 25 in which the Nb content of the steel sheet was 0.020 mass % was more excellent in buckling resistance than Test Material No. 28 in which the Nb content of the steel sheet was 0.040 mass %.

The invention claimed is:

1. A steel sheet for a battery outer tube can, the steel sheet comprising an Fe—Ni diffusion layer on each of both surfaces of the steel sheet,
   wherein the steel sheet has a composition consisting of, by mass, C in an amount of not more than 0.010%, Si in amount of not more than 0.02%, Mn in an amount of not more than 0.60%, P in an amount of not more than 0.020%, S in an amount of not more than 0.020%, Ni in an amount of not more than 0.05%, N in an amount of not more than 0.0050%, Nb in an amount of not less than 0.010% and not more than 0.050%, and Cr in an amount of more than 0 mass % and not more than 1.0%, with the balance being Fe and inevitable impurities,
   the Fe—Ni diffusion layer has a deposition amount of not less than 50 mg/m² and not more than 500 mg/m² in terms of an amount of Ni per one surface of the steel sheet,
   a proportion of Ni at an outermost surface of the Fe—Ni diffusion layer is not less than 1.0% and less than 20.0%, and
   the proportion of Ni is a proportion of the amount of Ni in a total amount of Fe and Ni at the outermost surface of the Fe—Ni diffusion layer, and a unit of the amount of Fe and the amount of Ni is at %.

2. The steel sheet for a battery outer tube can according to claim 1, wherein the Fe—Ni diffusion layer has a thickness of not less than 0.010 μm and less than 0.500 μm.

3. A battery outer tube can, comprising:
   an Fe—Ni diffusion layer on each of an inner surface and an outer surface of a steel sheet formed in a shape of a battery outer tube can; and
   further a Ni layer on the Fe—Ni diffusion layer on the outer surface of the steel sheet,
   wherein the steel sheet has a composition consisting of, by mass, C in an amount of not more than 0.010%, Si in amount of not more than 0.02%, Mn in an amount of not more than 0.60%, P in an amount of not more than 0.020%, S in an amount of not more than 0.020%, Ni in an amount of not more than 0.05%, N in an amount of not more than 0.0050%, Nb in an amount of not less than 0.010% and not more than 0.050%, and Cr in an amount of more than 0 mass % and not more than 1.0%, with the balance being Fe and inevitable impurities, part of the Fe—Ni diffusion layer on the outer surface of the steel sheet constitutes an Fe—Ni diffusion layer A having a deposition amount of not less than 50 mg/m$^2$ and not more than 500 mg/m$^2$ in terms of an amount of Ni per one surface of the steel sheet, a proportion of Ni at an outermost surface of the Fe—Ni diffusion layer is not less than 1.0% and less than 20.0%, and the proportion of Ni is a proportion of the amount of Ni in a total amount of Fe and Ni at the outermost surface of the Fe—Ni diffusion layer, and a unit of the amount of Fe and the amount of Ni is at %.

4. The battery outer tube can according to claim 3, wherein the Fe—Ni diffusion layer A has a thickness of not less than 0.010 μm and less than 0.500 μm.

5. The battery outer tube can according to claim 4, wherein the Ni layer has a thickness of not less than 1 μm.

6. The battery outer tube can according to claim 3, wherein the Ni layer has a thickness of not less than 1 μm.

7. A battery, comprising the battery outer tube can according to claim 3, and further comprising an electrolyte solution, an electrode, and a separator which are disposed in the battery outer tube can.

* * * * *